United States Patent
Ro et al.

(10) Patent No.: US 8,265,119 B2
(45) Date of Patent: Sep. 11, 2012

(54) METHOD AND APPARATUS FOR FREQUENCY ASSIGNMENT IN A FREQUENCY HOPPING MODE OF A WIRELESS COMMUNICATION SYSTEM

(75) Inventors: Sang Min Ro, Seoul (KR); Youn H. Heo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 268 days.

(21) Appl. No.: 12/613,242

(22) Filed: Nov. 5, 2009

(65) Prior Publication Data

US 2010/0158078 A1    Jun. 24, 2010

(30) Foreign Application Priority Data

Dec. 23, 2008 (KR) .................. 10-2008-0132507

(51) Int. Cl.
*H04B 1/69* (2011.01)
*H04B 1/707* (2011.01)
*H04B 1/713* (2011.01)

(52) U.S. Cl. ........ 375/132; 375/135; 375/136; 375/260; 375/267; 375/299; 370/330

(58) Field of Classification Search ............ 375/260, 375/267, 299, 347, 132, 135, 136; 370/330; 455/500, 101
See application file for complete search history.

(56) References Cited

U.S. PATENT DOCUMENTS

2008/0089286 A1* 4/2008 Malladi et al. ............ 370/330
* cited by examiner

*Primary Examiner* — Phuong Phu
(74) *Attorney, Agent, or Firm* — The Farrell Law Firm, P.C.

(57) ABSTRACT

A frequency allocation method and apparatus using a mirroring-assisted frequency hopping pattern is provided for retransmission in a wireless communication system operating in frequency hopping mode. A frequency allocation method for a wireless communication system operating in frequency hopping mode includes generating a mirroring pattern having a mirroring-assisted frequency hopping interval identical with a data retransmission interval; and allocating different frequency bands for an initial transmission and retransmission by performing frequency hopping according to the mirroring pattern. Preferably, the mirroring-assisted frequency hopping interval is shorter than the data retransmission interval.

16 Claims, 8 Drawing Sheets

METHOD AND APPARATUS FOR FREQUENCY ASSIGNMENT IN A FREQUENCY HOPPING MODE OF A WIRELESS COMMUNICATION SYSTEM

PRIORITY

This application claims priority under 35 U.S.C. §119(a) to a Korean Patent Application filed in the Korean Intellectual Property Office on Dec. 23, 2008, and assigned Serial No. 2008-0132507, the content of which is incorporated herein by reference.

BACKGROUND OF THE INVENTION

1. Field of the Invention

The present invention relates to a frequency allocation method of a wireless communication system operating in frequency hopping mode and an apparatus therefor and, in particular, to a frequency allocation method and apparatus using a mirroring-assisted frequency hopping pattern for retransmission in a wireless communication system operating in frequency hopping mode.

2. Description of the Related Art

Universal Mobile Telecommunications System (UMTS) is one of the third generation (3G) mobile telecommunication technologies, which is evolved from Global System for Mobile communications (GSM) and General Packet Radio Services (GPRS) and uses Wideband Code Division Multiple Access (WCDMA).

The $3^{rd}$ Generation Partnership Project (3GPP), which is responsible for the standardization of UMTS, is working on to significantly extend the performance of UMTS in the work item Long Term Evolution (LIE). LTE is a 3GPP standard that provides for a downlink speed of up to 300 Mbps and is expected to be commercially launched in 2010. In order to fulfill the requirements for the LTE systems, studies have been done in various aspects including minimization of the number of involved nodes in the connections and placing radio protocol as close as to the radio channels.

In the recent wireless communication systems, a mirroring technique is used for achieving frequency diversity gain to improve the reception reliability. As a representative example, Long Term Evolution (LIE) uses the mirroring technique for uplink transmission in frequency hopping mode. Particularly in Hybrid Automatic Repeat Request (HARQ) process, the LTE supports an inter-subframe frequency hopping with the mirroring technique for every initial transmission and retransmission to improve the reception reliability of the retransmitted data.

In the current standard specification, however, the HARQ retransmission is performed in unit of 8 subframes while a radio frame is composed of 10 subframes, and this difference diminishes further randomization of the frequency hopping even along with the mirroring technique, resulting in reduction of frequency diversity gain.

SUMMARY OF THE INVENTION

In order to solve the above problems of prior arts, a frequency allocation method for a wireless communication system operating in frequency hopping mode includes generating a mirroring pattern having a mirroring-assisted frequency hopping interval identical with a data retransmission interval; and allocating different frequency bands for an initial transmission and retransmission by performing frequency hopping according to the mirroring pattern. Preferably, the mirroring-assisted frequency hopping interval is shorter than the data retransmission interval.

In order to solve the above problems of prior arts, a transmission apparatus for a wireless communication system operating in frequency hopping mode includes a mirroring pattern generator which generates a mirroring pattern having a mirroring-assisted frequency hopping interval identical with a data retransmission interval; and a frequency allocator which allocates different frequency bands for an initial transmission and retransmission by performing frequency hopping according to the mirroring pattern. Preferably, the mirroring-assisted frequency hopping interval is shorter than the data retransmission interval.

DETAILED DESCRIPTION OF EMBODIMENTS OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

The terms used in following description are directed to the glossary specified in the 3GPP LTE standard specification. However, the present invention is not limited thereto, but can be applied to various types of wireless communication systems using a mirroring technique in HARQ process to achieve diversity gain.

Figure 1:
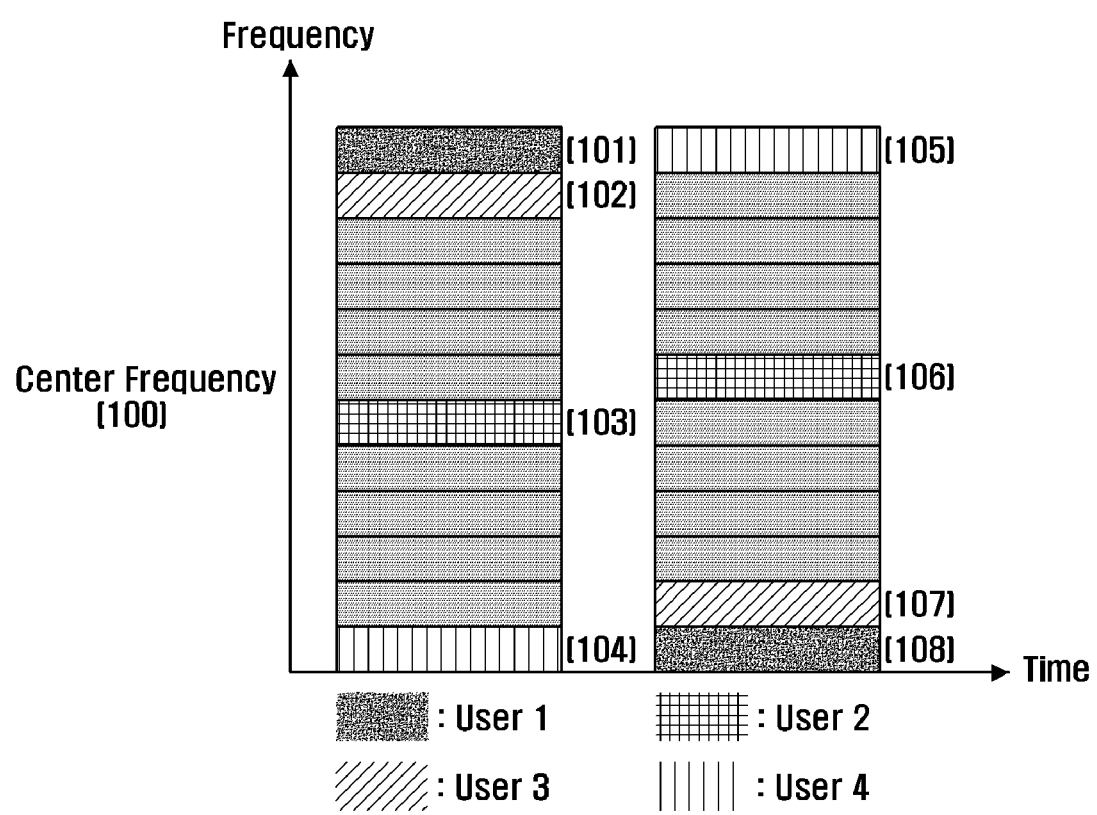
FIG. 1 is a diagram illustrating a principle of frequency hopping using a mirroring technique.

FIG. 1 is a diagram illustrating a principle of frequency hopping using a mirroring technique.

Referring to FIG. 1, 4 users (user 1, user 2, user 3, and user 4) are allocated frequency resources on a Physical Uplink Shared Channel (PUSCH) and the frequency resources are mirrored to achieve the frequency hopping. The user 1 is allocated a frequency resource 101 for an initial transmission and a frequency resource 108 for a next transmission, the frequency resources 101 and 108 being symmetric with each in position from the point of reference of a center frequency 100.

In similar manner, the user 2 is allocated frequency resources 102 and 107, the user 3 is allocated frequency resources 103 and 106, and the user 4 is allocated frequency resources 104 and 105, for their initial and next transmissions, the frequency resources for the initial and next transmissions being symmetric from the reference point of the center frequency 100. The mirroring technique switches the frequency resources symmetrically from the point of reference of the center frequency to achieve the frequency hopping. The transmission data unit can be one of frame, subframe, and slot depending on the system configuration.

Figure 2:
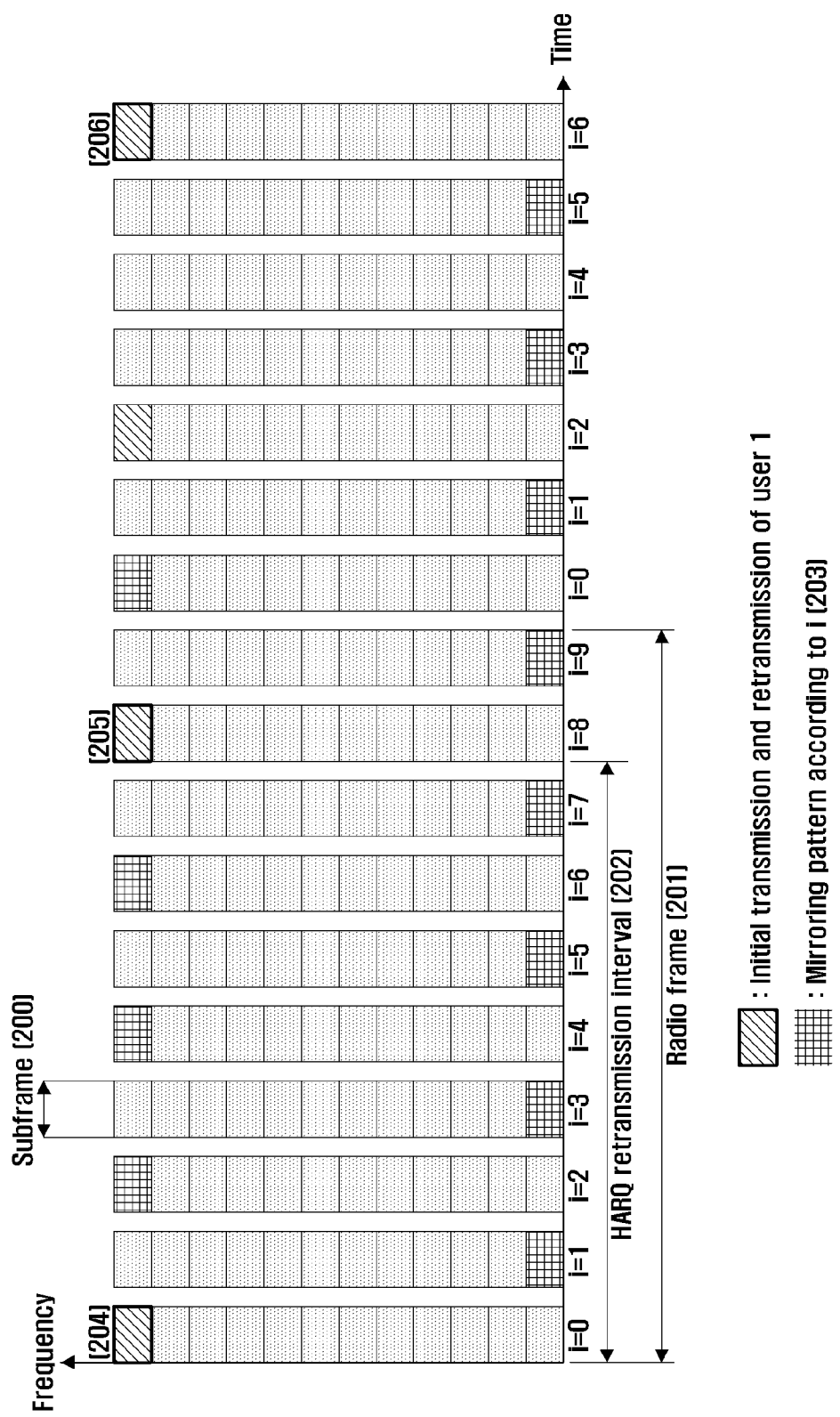
FIG. 2 is a diagram illustrating a principle of mirroring technique in HARQ process.

FIG. 2 is a diagram illustrating a principle of mirroring technique in HARQ process.

In case of an LTE system as depicted in FIG. 2, each user transmits a transmission packet in unit of subframe 200, and a radio frame consists of 10 subframes. In the specification of LTE standard, the HARQ retransmission is configured to be made in the interval of 8 subframes 202 for uplink data transmission. Also, the LTE standard specifies a frequency hopping mode adopting the mirroring technique in unit of subframe, and mirroring is determined by a formula (1):

$$f_m(i) = i \bmod 2 \quad (1)$$

where i is a subframe index in a radio frame and has a value in the range from 0 to 9, and $f_m(i)$ means a mirroring on/off pattern of $i^{th}$ subframe. That is, if $f_m(i)$ is 0, the mirroring is off for all the users in frequency hopping transmission mode; and otherwise if $f_m(i)$ is 1, the mirroring is on. Reference numeral 203 denotes a frequency hopping with mirroring, and the mirroring-added frequency hopping is performed ever two subframes. The mirroring pattern is changed in position from the point of reference of the center frequency.

In the view point of the user 2 in FIG. 2, however, the frequency resource allocated for the retransmissions 205 and 206 are identical with that allocated for the initial transmission 204. This means that the users cannot achieve the frequency diversity gains in the HARQ processes through the frequency hopping even with the mirroring technique.

Figure 3:
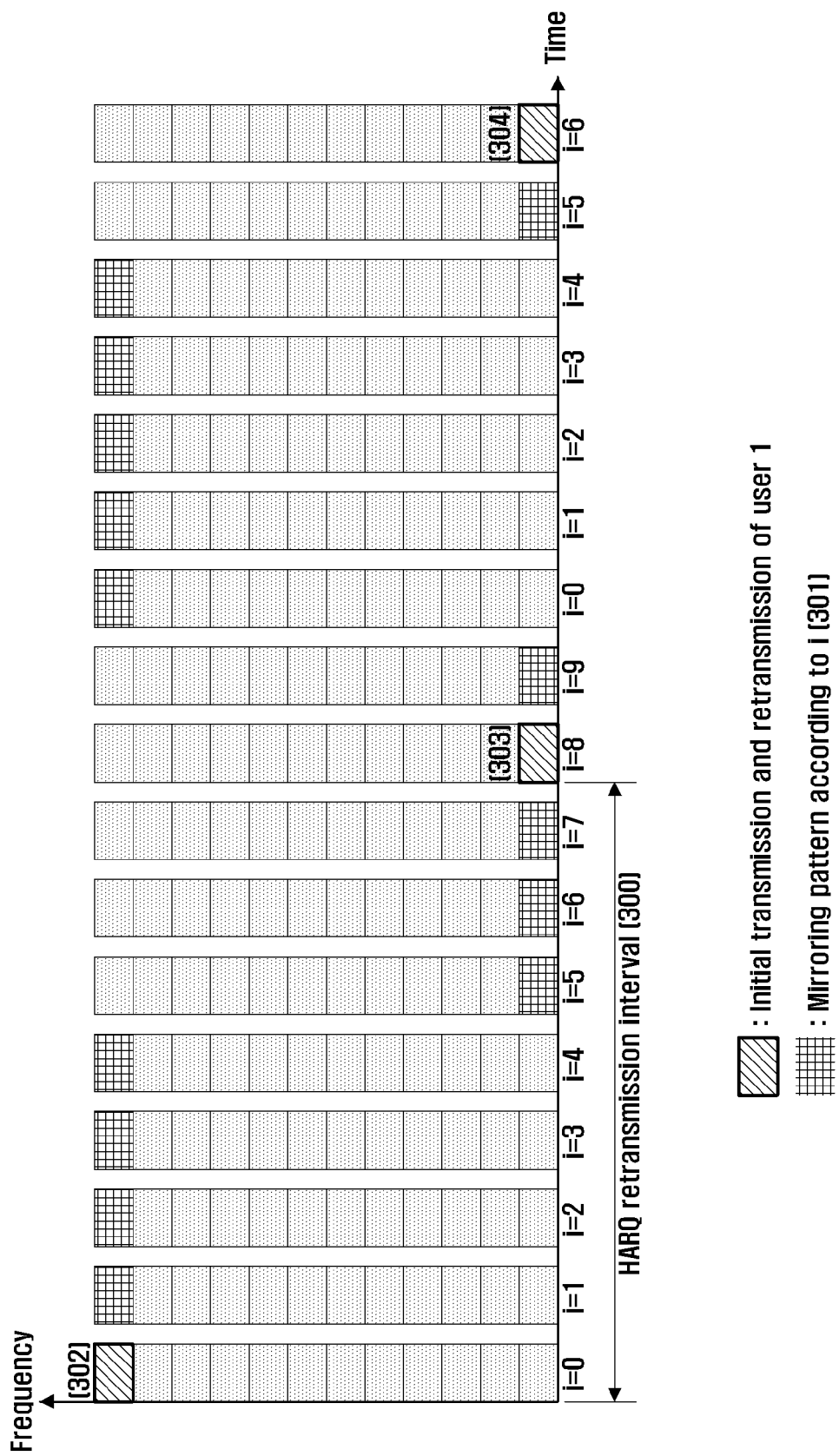
FIG. 3 is a diagram illustrating a principle of mirroring technique in HARQ process according to an exemplary embodiment of the present invention.

FIG. 3 is a diagram illustrating a principle of mirroring technique in HARQ process according to an exemplary embodiment of the present invention. In the exemplary embodiment of FIG. 3, it is assumed that the maximum number of transmissions including the initial transmission and HARQ retransmissions is 5, and the mirroring pattern is defined by $f_m(i)$. Also, $f_m(i)$ of formula 2 means a mirroring on/off pattern. If $f_m(i)$ is 0, mirroring is off and, otherwise if $f_m(i)$ is, mirroring is on:

$$f_m(i) = \lfloor i/5 \rfloor \bmod 2 \quad (2)$$

where $\lfloor i/5 \rfloor$ is a round-down of i/5 ($\lfloor i/5 \rfloor$ is a natural value).

From the mirroring pattern as denoted by reference numeral 301, it is known that the frequency hopping with mirroring occurs in unit of 5 subframes. Accordingly, the user 1 is allocated the frequency 302 for the initial transmission and another frequency for the first and second retransmissions 304 and 304, thereby achieving the frequency diversity, resulting in overcoming the problem of the prior art.

The mirroring pattern represented by formula (2) can be generalized by formula (3):

$$f_m(i) = \lfloor i/G \rfloor \bmod 2 \quad (3)$$

where G denotes a frequency hopping interval with mirroring and is an integer value adjustable in consideration of the length of a radio frame and HARQ retransmission interval, $\lfloor i/G \rfloor$ denotes a round-down of i/G and is a natural value. Here, G has a value greater than two subframes and equal to or less than the HARQ retransmission.

Figure 4:
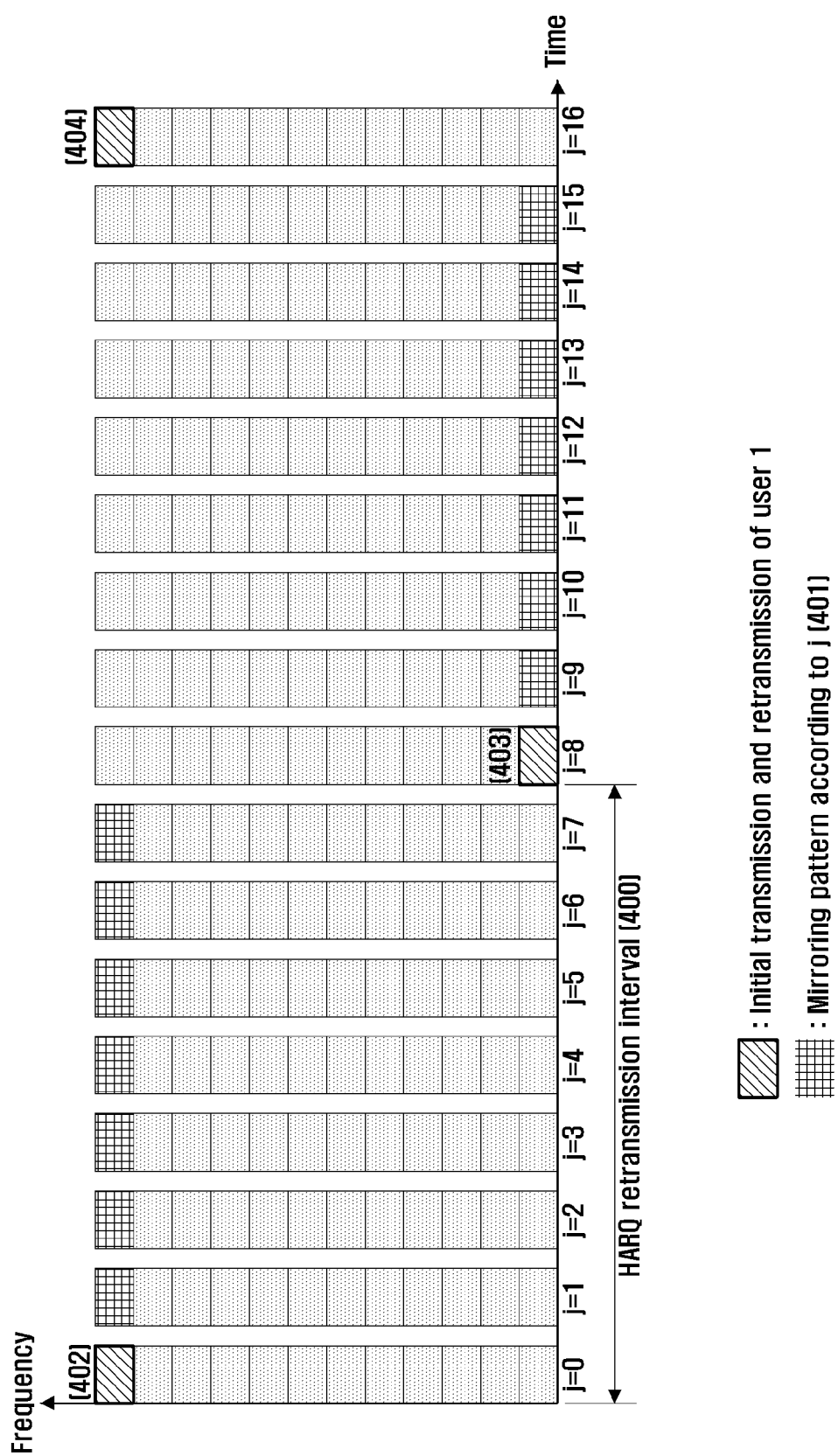
FIG. 4 is a diagram illustrating a principle of mirroring technique in HARQ process according to another exemplary embodiment of the present invention.

FIG. 4 is a diagram illustrating a principle of mirroring technique in HARQ process according to another exemplary embodiment of the present invention.

In the exemplary embodiment of FIG. 4, a parameter j=10k+i indicating the $i^{th}$ subframe index in the $k^{th}$ radio frame is newly defined by extending the definition on the subframe index i in the radio frame. With this new parameter, the mirroring pattern $f_m(i)$ can be written as formula (4):

$$f_m(j) = \lfloor j/8 \rfloor \bmod 2 (j=10k+i) \quad (4)$$

where $\lfloor j/8 \rfloor$ denotes a round-down value of j/8 ($\lfloor j/8 \rfloor$ is a natural value).

In FIG. 4 the frequency hopping interval with mirroring is 8 subframes such that the mirroring is performed in unit of 8 subframes that is identical with the HARQ retransmission interval. Accordingly, the initial transmission 402 and first and second HARQ retransmissions 403 and 404 of the user 1 are made on the two frequency bands alternately, whereby respective users can achieve the frequency diversity with the mirroring in consistence with retransmission timing. The mirroring pattern represented by formula (4) can be generalized with the HARQ retransmission interval of M subframes as following:

$$f_m(j) = \lfloor j/M \rfloor \bmod 2 (j=10k+j)$$

where $\lfloor j/M \rfloor \bmod 2$ denotes a round-down value of j/M ($\lfloor j/M \rfloor$ is a natural value).

Figure 5:
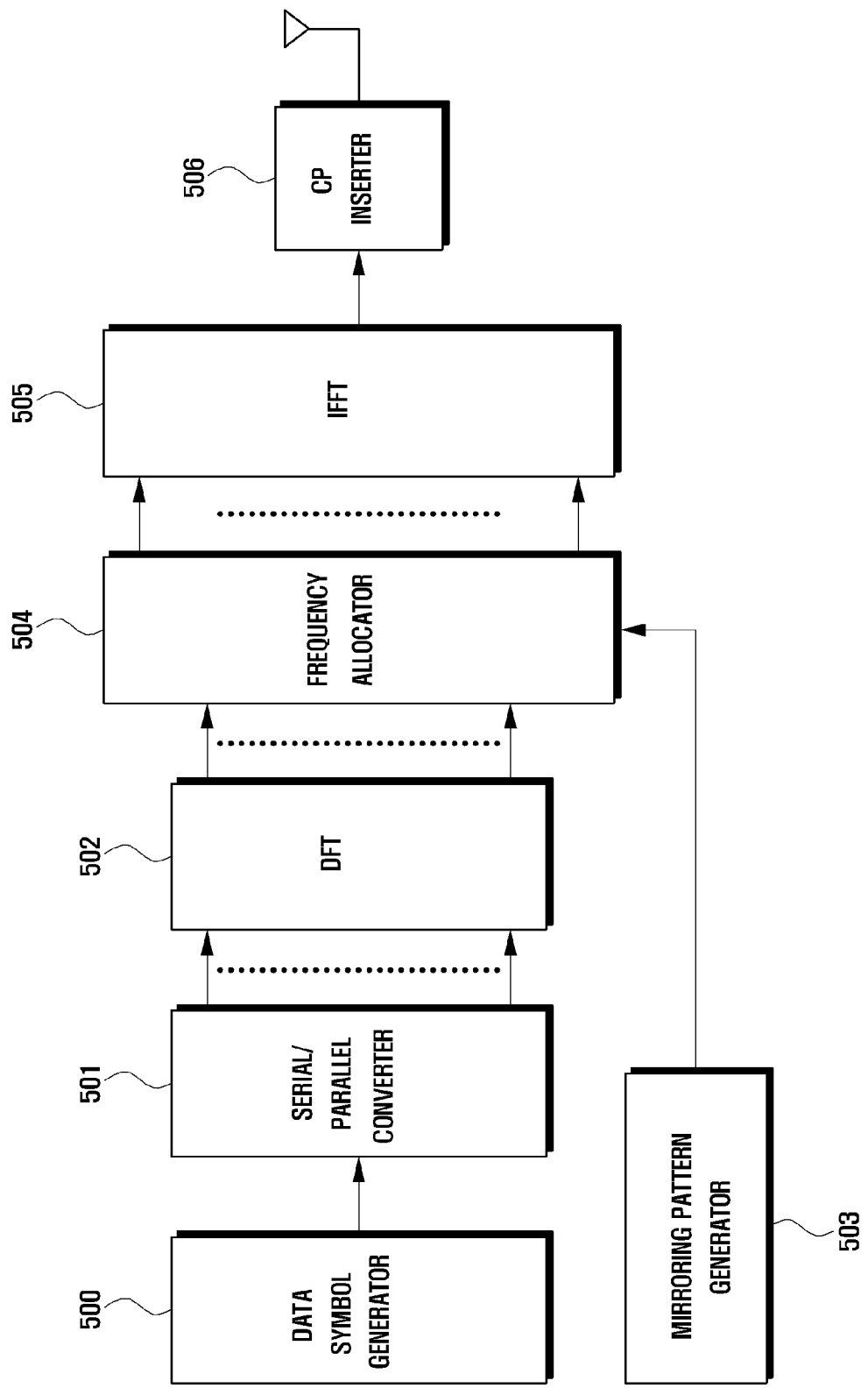
FIG. 5 is a block diagram illustrating a transmission apparatus according to an exemplary embodiment of the present invention.

FIG. 5 is a block diagram illustrating a transmission apparatus according to an exemplary embodiment of the present invention.

Referring to equation 5, the transmission apparatus, i.e. a mobile terminal, includes a data symbol generator 500, a serial/parallel converter 501, a Discrete Fourier Transformer (DFT) 502, a mirroring pattern generator 503, a frequency allocator 504, an Inverse Fast Fourier Transformer (IFFT) 505, and a Cyclic Prefix (CP) inserter 506.

The data symbol generator 500 outputs a data symbol stream to the serial/parallel converter 501, and the serial/parallel converter 501 outputs the data symbols to the DFT 502 in parallel. The DFT 502 transforms the parallel input data symbols in frequency domain and output the transformed signals to the frequency allocator 504.

The frequency allocator 504 allocates frequency bands to the transformed frequency domain representative signals according to a cell-specific mirroring pattern in the entire system bandwidth. The frequency allocator 504 outputs the signals to the IFFT 505, and the IFFT 505 transforms the signals inversely in time domain and outputs the inversely transformed signal to the CP inserter 506. The CP inserter 506 inserts a CP in to the signal and transmits the CP-inserted signal to a base station.

Figure 6:
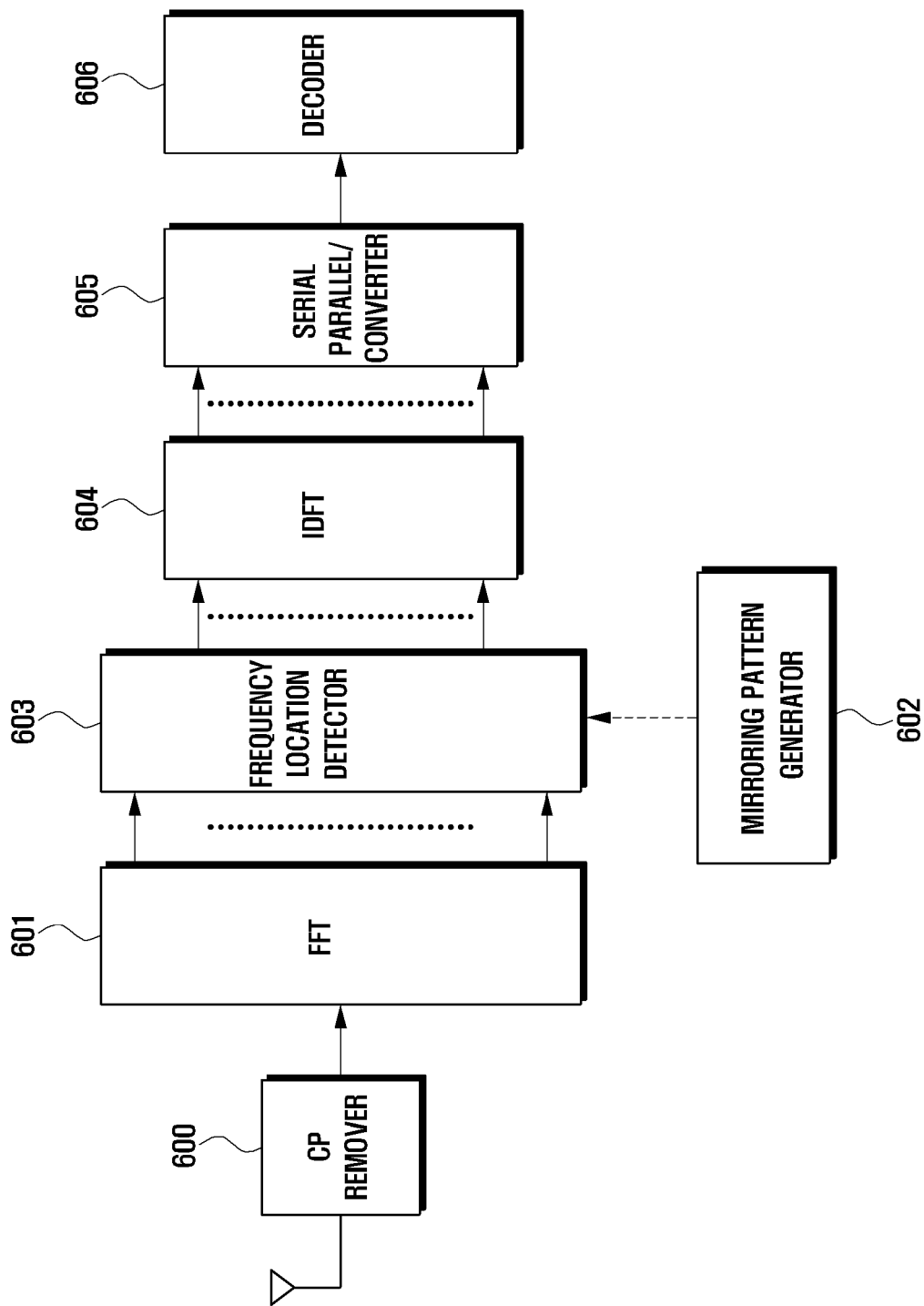
FIG. 6 is a block diagram illustrating a reception apparatus according to an exemplary embodiment of the present invention.

FIG. 6 is a block diagram illustrating a reception apparatus according to an exemplary embodiment of the present invention.

Referring to FIG. 6, the reception apparatus, i.e. a base station, includes a CP remover 600, a Fast Fourier Transformer (FFT) 601, a mirroring pattern generator 602, a frequency location detector 603, an inverse Discrete Fourier Transformer (IDFT) 604, a parallel/serial converter 605, and a decoder 606.

Once an uplink signal is received at the reception apparatus, the CP remover 600 removes the CP from the received signal and outputs the CP-removed signal to the FFT 601. The FFT 601 transforms the signal in frequency domain and outputs the transformed signals to the frequency location detector 603.

The mirroring pattern generator 602 generates the mirroring pattern identical with that generated at the mirroring pattern generator 503 of the transmitter and provides the mirroring pattern to the frequency location detector 603. The frequency location detector 603 detects the frequency locations of the respective users within the system bandwidth with reference to the mirroring pattern provided by the mirroring pattern generator 602.

The IDFT 604 transforms the signals transmitted by the respective users inversely in time domain and outputs the inversely Fourier-transformed signals to the parallel/serial converter 605 in parallel, and the parallel/serial converter 605 converts the parallel signals into serial serials. Finally, the decoder 606 decodes the signals output by the parallel/serial converter 605 in series to recover the transmitted data.

Figure 7:
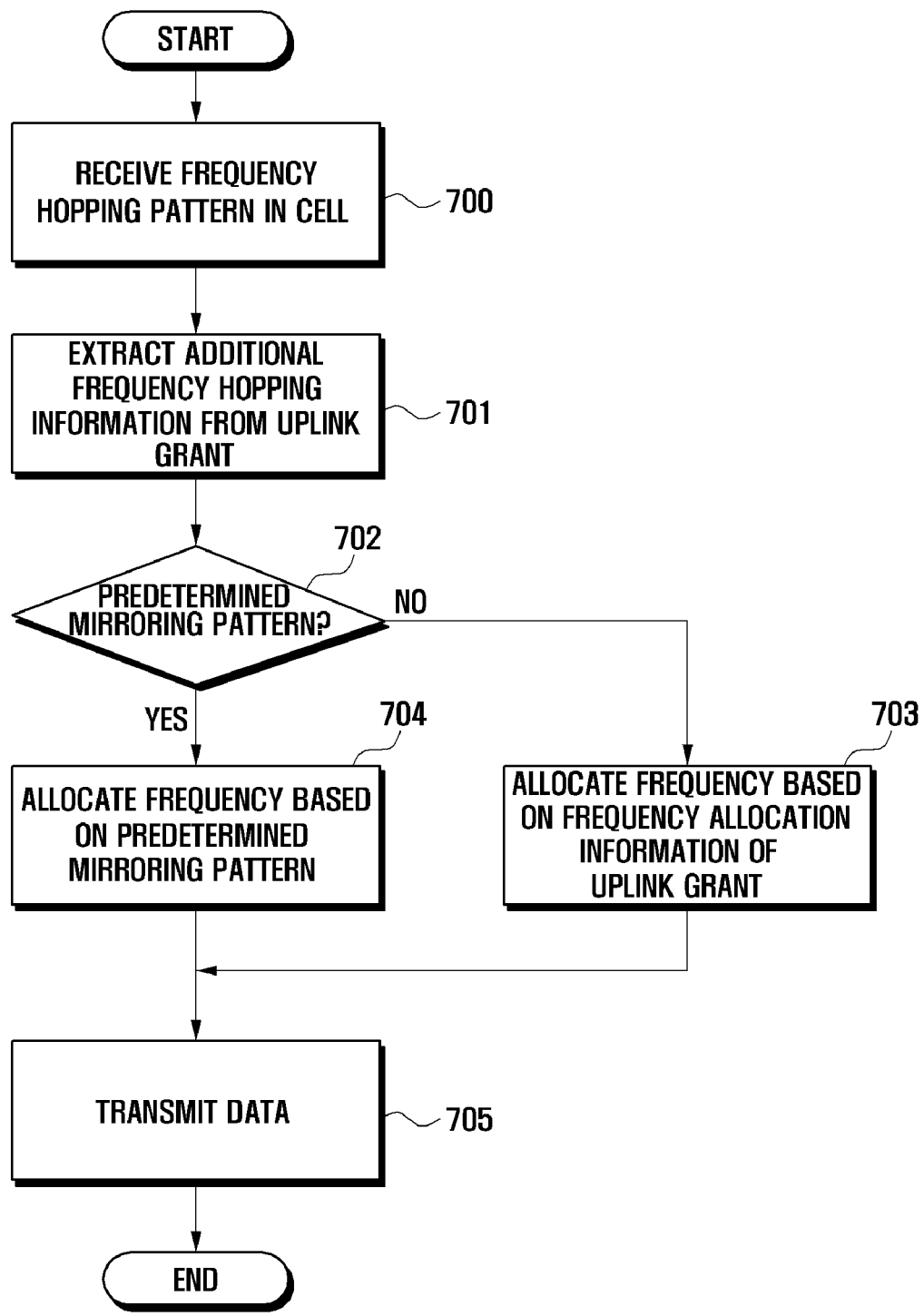
FIG. 7 is a flowchart illustrating a signal transmission method according to an exemplary embodiment of the present invention.

FIG. 7 is a flowchart illustrating a signal transmission method according to an exemplary embodiment of the present invention.

Referring to FIG. 7, a mobile terminal receives frequency hopping information broadcast by a base station within a cell (700). From the cell-specific frequency hopping information, the mobile terminal detects whether the frequency hopping is an intra-subframe frequency hopping or an inter-subframe frequency hopping. Next, the mobile terminal extracts user-specific frequency hopping information from an uplink grant transmitted by the base station (701) and determines, based on the user-specific frequency hopping information, whether the user-specific frequency hopping follows a predetermined mirroring pattern (702). Here, the predetermined mirroring pattern means the mirroring pattern described above with reference to an exemplary embodiment of the present invention. If the user-specific frequency hopping pattern does not follow the predetermined mirroring pattern, the mobile terminal performs the frequency hopping based on the frequency hopping information extracted from the uplink grant (703).

Otherwise if the user-specific frequency hopping pattern follows the predetermined mirroring pattern, the mobile terminal performs the frequency hopping based on the mirroring pattern according to an exemplary embodiment of the present invention (704). Finally, the mobile terminal transmits data through the frequency band allocated at step 703 or 704 (705).

Figure 8:
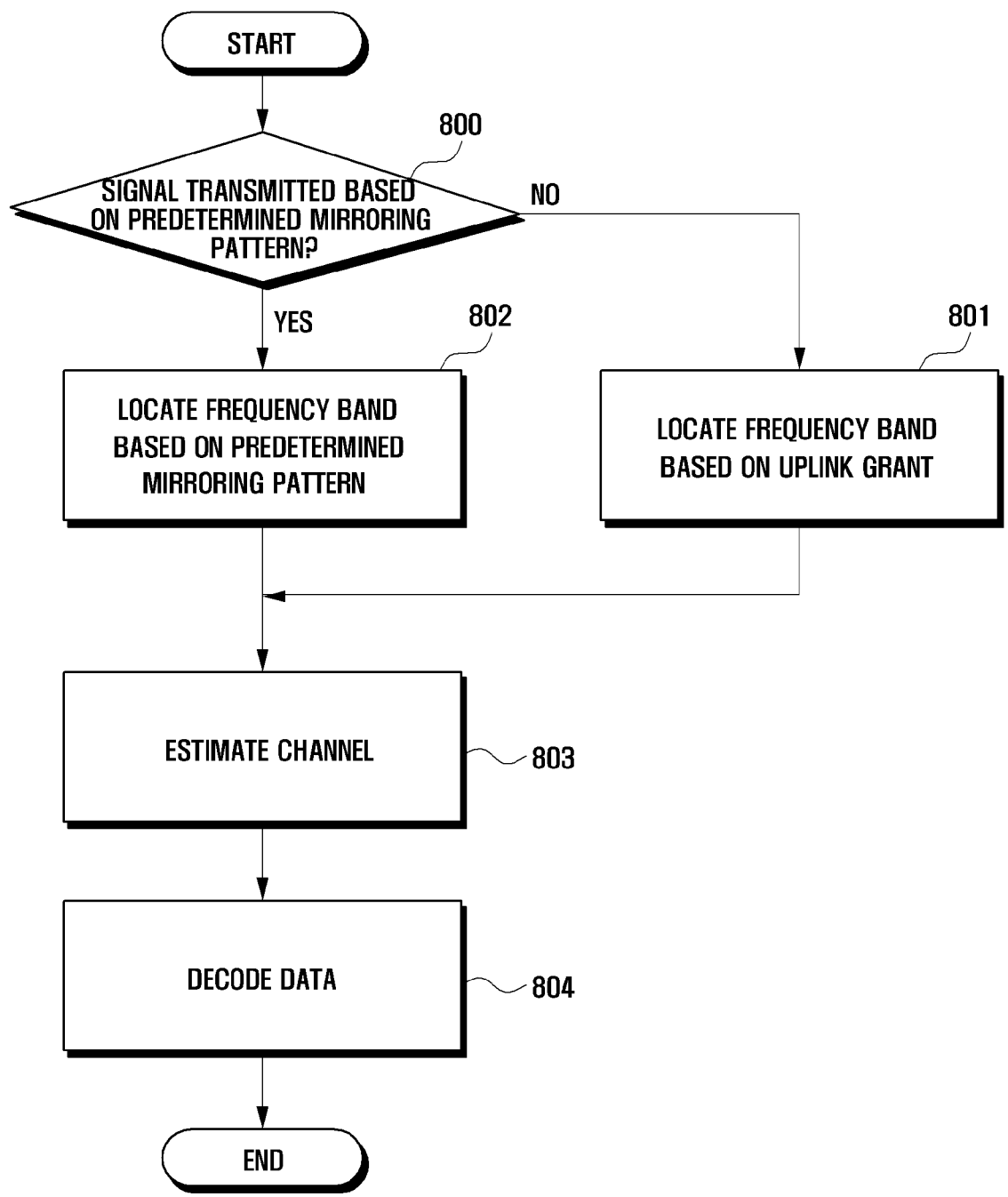
FIG. 8 is a flowchart illustrating a signal reception method according to an exemplary embodiment of the present invention.

Referring to FIG. 8, a base station determines whether a received signal from a mobile terminal is transmitted according to a mirroring pattern predefined between the base station and the mobile terminal (800). If the signal is not transmitted according to the predefined mirroring pattern, the base station locates the frequency band allocated to the mobile terminal for the data transmission based on the frequency allocation information of the uplink grant that is transmitted from the base station to the mobile terminal (801).

Otherwise if the signal is transmitted according to the predefined mirroring pattern, the base station locates the frequency band allocated to the mobile terminal for the data transmission with reference to the predefined mirroring pattern (802). Next, the base station performs channel estimation to the data received through the frequency bands corresponding to respective mobile terminals detected at step 802 (803)

and then decodes the data transmitted by the respective mobile station using the estimated channel values (804).

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A frequency allocation method for a wireless communication system operating in frequency hopping mode, comprising:
    determining whether mirroring is used or not, the mirroring being determined to be used and not to be used alternately in accordance with a number of packet transmissions;
    allocating a frequency resource for a packet transmission based on a result of the determination; and
    receiving a packet using the allocated frequency resource.

2. The frequency allocation method of claim 1, wherein whether mirroring is used or not used is determined by $f_m(j)$, and for an $i^{th}$ subframe of a $k^{th}$ radio frame $f_m(j)$ is defined by:
    $f_m(j)=\lfloor j/M \rfloor$ mod 2, where, $j=p*k+i$, p is a number of subframes of a radio frame, and M is a data retransmission interval measured in number of subframes.

3. The frequency allocation method of claim 2, wherein allocating frequency resource for a packet transmission comprises:
    allocating, if $f_m(j)$ is 1, frequency resource for an $i^{th}$ subframe of a $k^{th}$ radio frame using mirroring; and
    allocating, if $f_m(j)$ is 0, frequency resource for an $i^{th}$ subframe of a $k^{th}$ radio frame without using mirroring.

4. The frequency allocation method of claim 2, wherein p is 10 and M is 8.

5. A reception apparatus for a wireless communication system operating in frequency hopping mode, comprising:
    a frequency allocator which determines whether mirroring is used or not, the mirroring being determined to be used and not to be used alternately in accordance with a number of packet transmissions, and allocates frequency resource for a packet transmission based on a result of the determining; and
    a communication unit for receiving a packet using the allocated frequency resource.

6. The reception apparatus of claim 5, wherein whether mirroring is used or not is determined by $f_m(j)$, and for an $i^{th}$ subframe of a $k^{th}$ radio frame $f_m(j)$ is defined by:
    $f_m(j)=\lfloor j/M \rfloor$ mod 2, where, $j=p*k+i$, p is a number of subframes of a radio frame, and M is a data retransmission interval measured in number of subframes.

7. The reception apparatus of claim 6,
    wherein the frequency allocator allocates, if $f_m(j)$ is 1, frequency resource for an $i^{th}$ subframe of a $k^{th}$ radio frame using mirroring, and allocates, if $f_m(j)$ is 0, frequency resource for an $i^{th}$ subframe of a $k^{th}$ radio frame without using mirroring.

8. The reception apparatus of claim 6, wherein p is 10 and M is 8.

9. A frequency allocation method for a wireless communication system operating in frequency hopping mode, comprising:
    determining whether mirroring is used or not, the mirroring being determined to be used and not to be used alternately in accordance with a number of packet transmissions;

allocating frequency resource for a packet transmission based on a result of the determination; and transmitting a packet using the allocated frequency resource.

10. The frequency allocation method of claim 9, wherein whether mirroring is used or not used is determined by $f_m(j)$, and for an $i^{th}$ subframe of a $k^{th}$ radio frame $f_m(j)$ is defined by:

$f_m(j) = \lfloor j/M \rfloor \bmod 2$, where, $j = p*k+i$, p is a number of subframes of a radio frame, and M is a data retransmission interval measured in number of subframes.

11. The frequency allocation method of claim 10, wherein allocating frequency resource for a packet transmission comprises:

allocating, if $f_m(j)$ is 1, frequency resource for an $i^{th}$ subframe of a $k^{th}$ radio frame using mirroring; and allocating, if $f_m(j)$ is 0, frequency resource for an $i^{th}$ subframe of a $k^{th}$ radio frame without using mirroring.

12. The frequency allocation method of claim 10, wherein p is 10 and M is 8.

13. A transmission apparatus for a wireless communication system operating in frequency hopping mode, comprising:

a frequency allocator which determines whether mirroring is used or not, the mirroring being determined to be used and not to be used alternately in accordance with a number of packet transmissions, and allocates frequency resource for a packet transmission based on a result of the determining; and a communication unit for transmitting a packet using the allocated frequency resource.

14. The transmission apparatus of claim 13, wherein whether mirroring is used or not is determined by $f_m(j)$, and for an $i^{th}$ subframe of a $k^{th}$ radio frame $f_m(j)$ is defined by:

$f_m(j) = \lfloor j/M \rfloor \bmod 2$, where, $j = p*k+i$, p is a number of subframes of a radio frame, and M is a data retransmission interval measured in number of subframes.

15. The transmission apparatus of claim 14, wherein the frequency allocator allocates, if $f_m(j)$ is 1, frequency resource for an $i^{th}$ subframe of a $k^{th}$ radio frame using mirroring, and allocates, if $f_m(j)$ is 0, frequency resource for an $i^{th}$ subframe of a $k^{th}$ radio frame without using mirroring.

16. The transmission apparatus of claim 14, wherein p is 10 and M is 8.

* * * * *